United States Patent [19]

Englehardt

[11] Patent Number: 4,550,945
[45] Date of Patent: Nov. 5, 1985

[54] TRUCK BED CLOSURE

[75] Inventor: Paul Englehardt, Hawthorne, N.J.

[73] Assignee: PEI, Inc., Hawthorne, N.J.

[21] Appl. No.: 401,818

[22] Filed: Jul. 26, 1982

[51] Int. Cl.⁴ .......................... B60P 7/02; E05C 1/02; B60R 25/00

[52] U.S. Cl. .................................. 296/100; 160/213; 292/183; 52/71; 340/63

[58] Field of Search ....... 296/100, 39 R, 41, 181–183, 296/219, 220; 160/181, 213; 292/183, 189; 49/13; 16/225; 52/71, 630, 738; 340/63

[56] References Cited

U.S. PATENT DOCUMENTS

| | | | |
|---|---|---|---|
| 2,457,129 | 12/1948 | Collings | 52/630 |
| 3,067,843 | 12/1962 | Rushtoh et al. | 52/630 |
| 3,128,120 | 4/1964 | Fournier et al. | 16/225 |
| 3,186,525 | 6/1965 | Gresham et al. | 52/630 |
| 3,512,828 | 5/1970 | Craft | 296/100 |
| 3,514,152 | 5/1970 | Hermon | 296/100 |
| 3,578,375 | 5/1971 | Finefrock | 296/39 R |
| 3,768,858 | 10/1973 | Boismier | 296/100 |
| 3,997,870 | 12/1976 | Horvath | 340/63 |
| 4,222,032 | 9/1980 | Speer | 340/63 |
| 4,274,077 | 6/1981 | Feiger | 340/63 |
| 4,284,980 | 8/1981 | Hoinski | 49/13 |
| 4,313,636 | 2/1982 | Deeds | 296/100 |
| 4,418,954 | 12/1983 | Buckley | 296/100 |

FOREIGN PATENT DOCUMENTS 233413 5/1964 Austria ................. 296/100

Primary Examiner—Robert B. Reeves
Assistant Examiner—Dennis H. Pedder
Attorney, Agent, or Firm—McAulay, Fields, Fisher, Goldstein & Nissen

[57] ABSTRACT

A closure for a load container such as an open bed of a truck having a rectangular opening formed by side walls. The closure comprises a plurality of elongated panels each configured to extend greater than the width of the rectangular opening to rest on two opposite side walls of the load container. The panels are hingedly connected together side-by-side at the longitudinal edges thereof for movement between an unfolded position wherein the panels lie in a single plane and completely close the opening and a fan-folded position wherein the panels lie in a single stack superposed on one end panel. The one end panel is fastened at a third side wall forming the rectangular opening of the load container. The ends of the panels have pins for limiting lateral movement when in the unfolded position. The other end panel can be releasably locked onto the fourth side wall when the panels are in the unfolded position.

22 Claims, 12 Drawing Figures

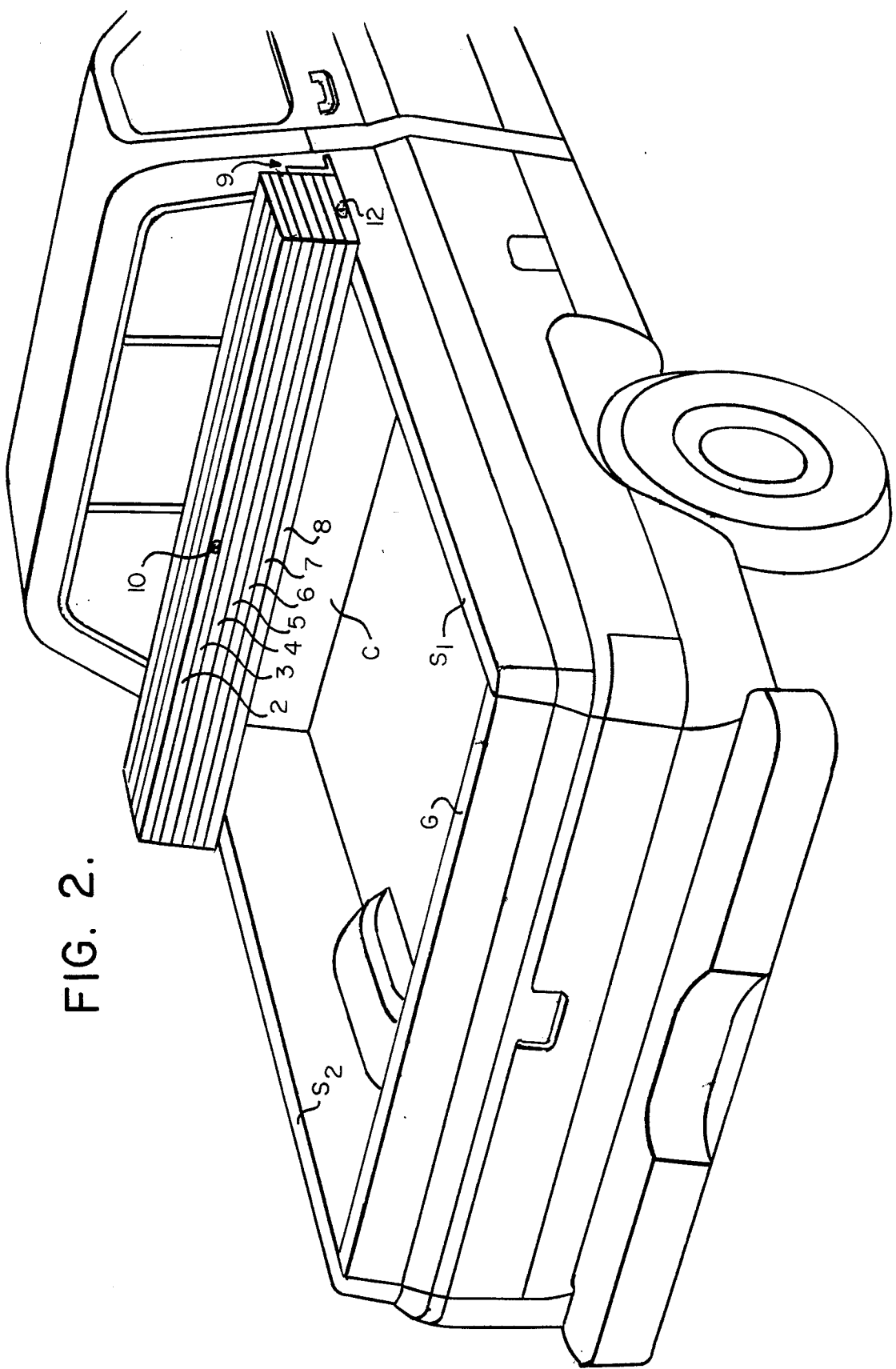

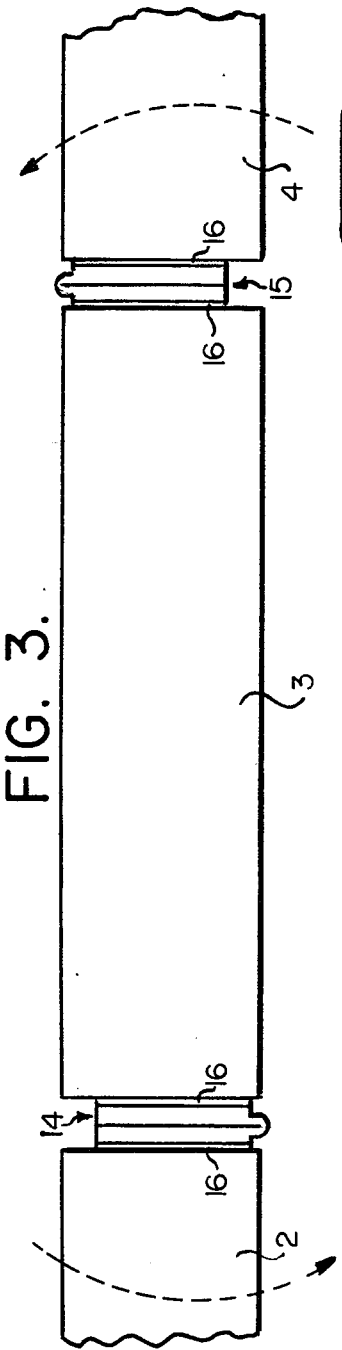
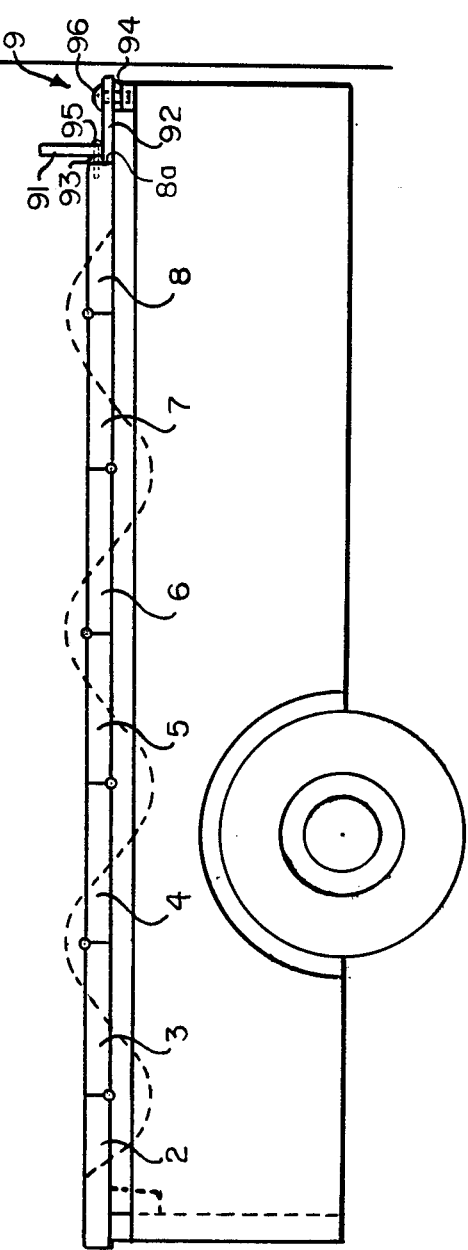

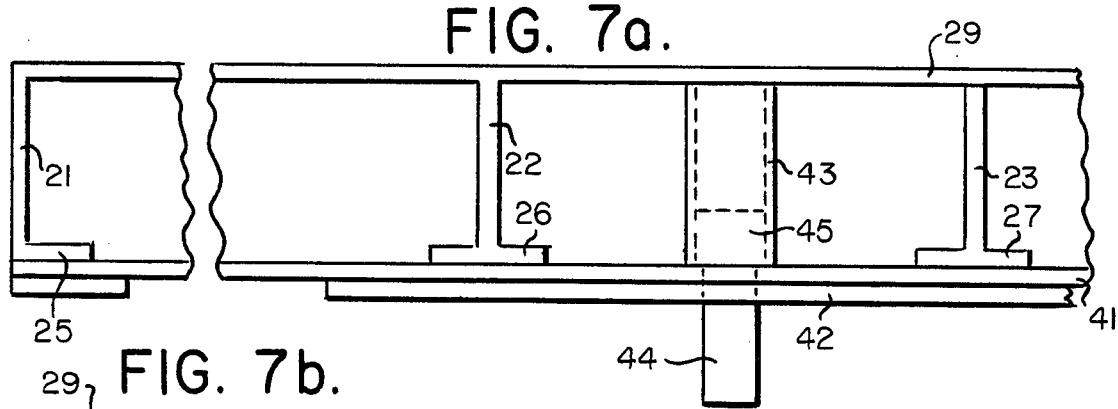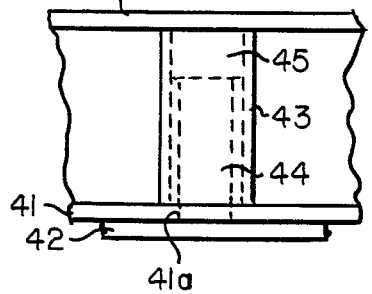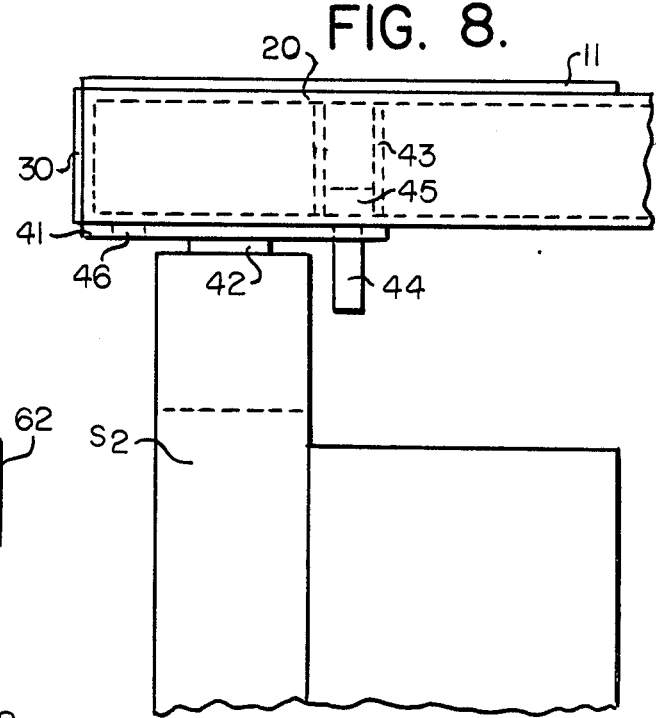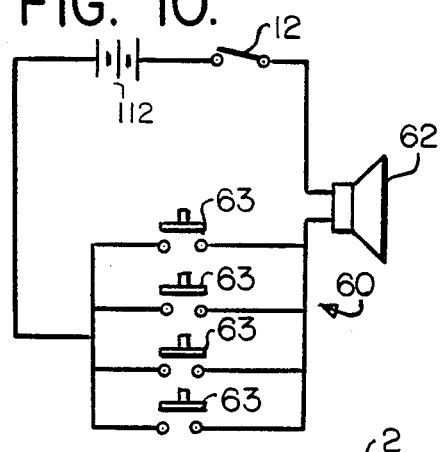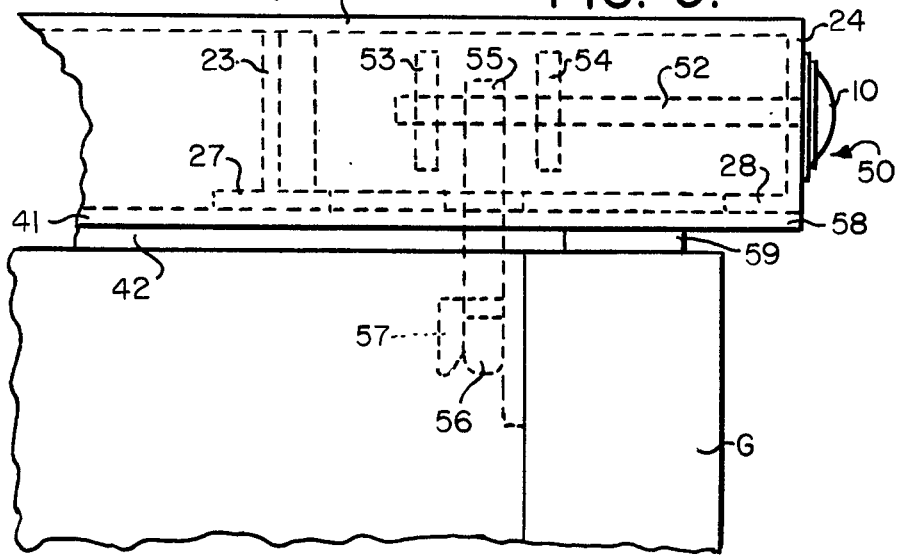

TRUCK BED CLOSURE

BACKGROUND OF THE INVENTION

The present invention relates to a closure for a load container having a rectangular opening and in particular to the closure for a truck having a rectangular open bed load container.

A truck closure of this type is known in the prior art which comprised a plurality of hingedly connected panel members, one end of which was pivotally connected to the inside end of the rectangular truck bed. The panels were configured to be slightly wider than the width of the open portion of the truck bed and were foldable into a juxtaposed position so that all of the panels were stacked at the inner end of the truck bed when the closure was not used to enclose same. When it was desired to enclose the body, the panels were folded outwardly so that any desired amount of body portion was covered. These were a sufficient number of panels to completely cover the whole rectangular bed.

While this closure had certain advantages, it also had a number of disadvantages which made its use problematical. For example, the closure was not water proof and thus the contents of the truck bed would become wet in the rain. The prior art closure had no provision for locking or for an alarm and thus the contents of the truck bed could be stolen when such a closure was used. Furthermore, the top of the closure was planar and smooth and if it became wet or if one sought to stack a load thereon, it easily slid off since the top was slippery. The closure was also impractical in that there was nothing preventing the lateral movement of the closure in the event of loads in that direction nor was there any protection for the truck cab from the closure in the event that the truck came to a sudden stop and the momentum of the closure carried the closure towards the cab.

SUMMARY OF THE INVENTION

The main object of the present invention is to provide an improved closure for a load container such as the open bed of a truck which overcomes the disadvantages of prior art closures.

Another object of the present invention is to provide a closure which is a self-contained, portable, flat bed and security system for a open type body pick-up truck and which can be made of any type of lightweight material such as aluminum or plastic.

A further object is to provide a closure which can be fastened and removed to the front of a truck body quickly and easily, for example, by the use of wing nuts or the like.

Another object of the present invention is to provide a closure which completely seals the truck bed and therefore provides a weather-proof box.

In accordance with the present invention, these and other objects are achieved by a closure comprising a plurality of elongated panels each configured to extend greater than the width of a rectangular opening so as to rest on the two opposite side walls of the load container. The closure also includes means hingedly connecting the panels together, side-by-side, at the longitudinal edges thereof for movement between an unfolded position wherein the panels lie in a single plane and completely close the opening and a fan folded position wherein the panels lie in a single stack superposed on one end panel. Means are provided for fastening the one end panel at a third side wall of the container and means are disposed at the ends of each panel and engageable with the two side walls for preventing lateral movement of the panels when in the unfolded position.

The closure also preferably comprises antiskid means disposed on one face of each panel, corresponding to the outside face thereof when in the unfolded position, and which is preferably longitudinal projecting ribs.

The means hingedly connecting the panels preferably comprises a living hinge between each pair of adjoining panels and extending the entire length of each panel. The hinges are alternatively oppositely acting to enable the fan folding of the panels. In conjunction therewith, sealing strips are disposed on the face of each panel corresponding to the inside face thereof when in the unfolded position and the strips are disposed between the portion of the inside face abutting the side walls so that the sealing strips in conjunction with a living hinge, provide a weather proof and water proof covering for the container.

The panels preferably have the shape of channels which can be easily extruded from aluminum or plastic and thus provide a strong but lightweight closure which is therefore portable. The channel shaped panels can comprise longitudinal strengthening ribs to provide further strength. Moreover, the channels have caps at the end thereof which are preferably made of plastic or other lightweight material and which further provide the sealing of the entire unit.

In order to prevent lateral movement of the closure which might normally occur due to side loading, drop pins are mounted in the center and end panels at the ends thereof inwardly of the side walls and which drop down due to free sliding movement thereof when the panels are in the unfolded position.

The means fastening the closure to a truck, preferably comprises an L-shaped member, with the vertical flange thereof connected to the closure and the horizontal flange thereof connected to the truck side walls.

The closure also has the ability to be a self-contained security unit for a truck. The end panel closest to the tail gate of the truck has locking means contained therein for engaging with the tail gate to lock the closure in the unfolded position during use. The end panel closest to the cab has a solid state alarm system therein which, in response to the lifting of any of the panels from the unfolded position, will result in the emission of an audible alarm.

The advantages of the closure according to the present invention is that it provides a complete security system, it also serves as a flat loading area, thereby doubling the original loading area, it provides a weather-proof enclosure, it can serve as a portable work bench or picnic table, it is usable with other load containers other than trucks, it can serve as a combination tool and storage box, it is compact and requires minimal amount of storage space, it can be easily removed and replaced and is easily transferable from one truck bed to another.

These and other objects and advantages of the present invention will become clear from the foregoing detailed description of the invention in conjunction with the attached drawings, wherein:

BRIEF DESCRIPTION OF THE DRAWINGS

FIG. 2 is a perspective view of the closure according to the present invention on a truck bed and in the folded position;

FIG. 3 is a side view of the hinged connection between adjoining panels;

FIG. 4 is a side view of the closure on a truck bed;

FIGS. 7a and 7b are end views of panels showing the drop pin in the projecting and retracted positions;

FIG. 8 is a rear view showing a portion of a panel on the side wall of the truck;

FIG. 9 is a sectional view of the locking mechanism according to the present invention; and FIG. 10 is a schematic of the alarm circuit according to the present invention.

DETAILED DESCRIPTION OF THE PREFERRED EMBODIMENTS

Figures 1, 1A:
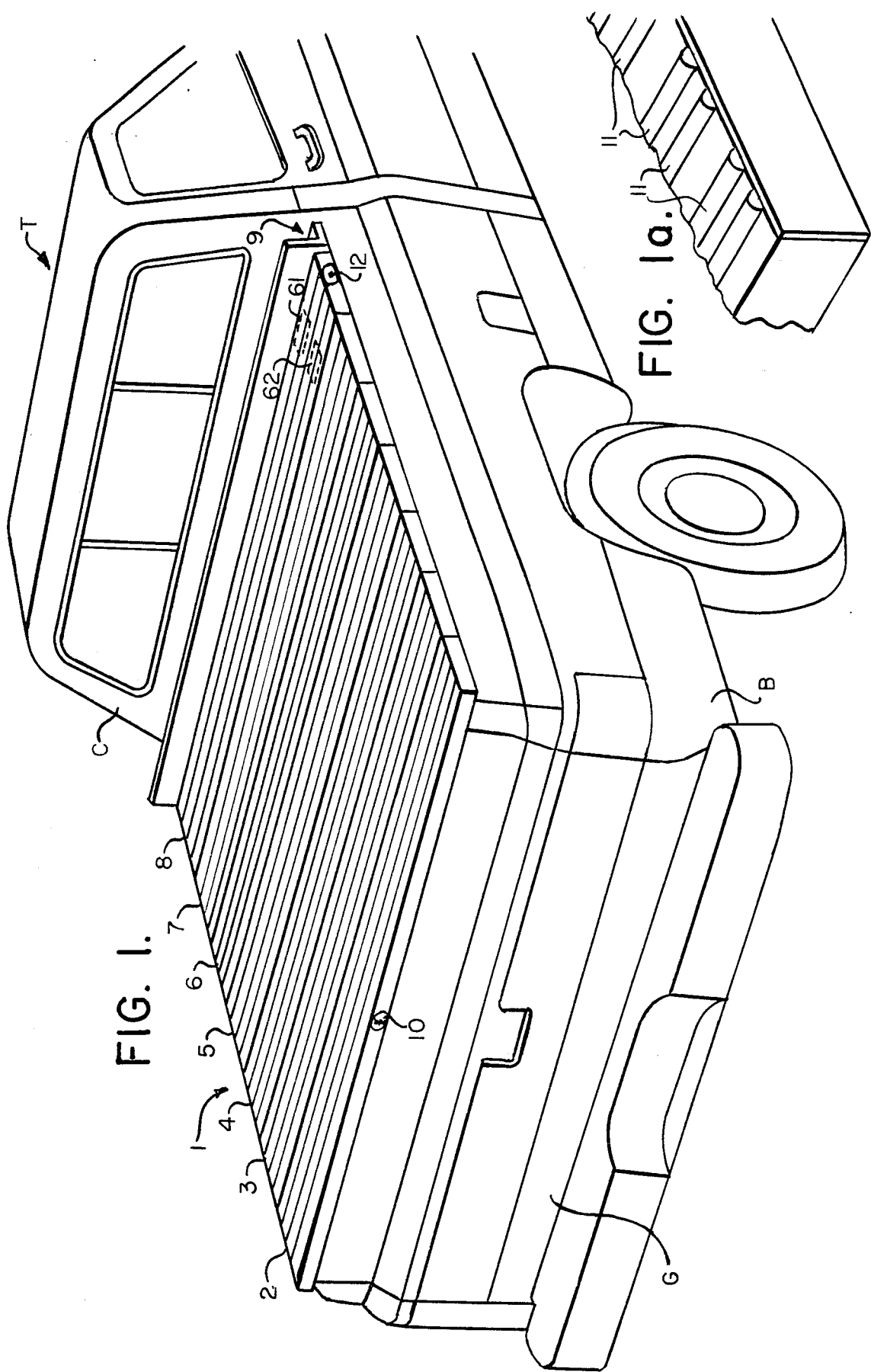
FIG. 1 is a perspective view of the closure according to the present invention mounted on a truck bed and in the unfolded position.
FIG. 1a is a detail of the panels shown in FIG. 1.
Figure 5:
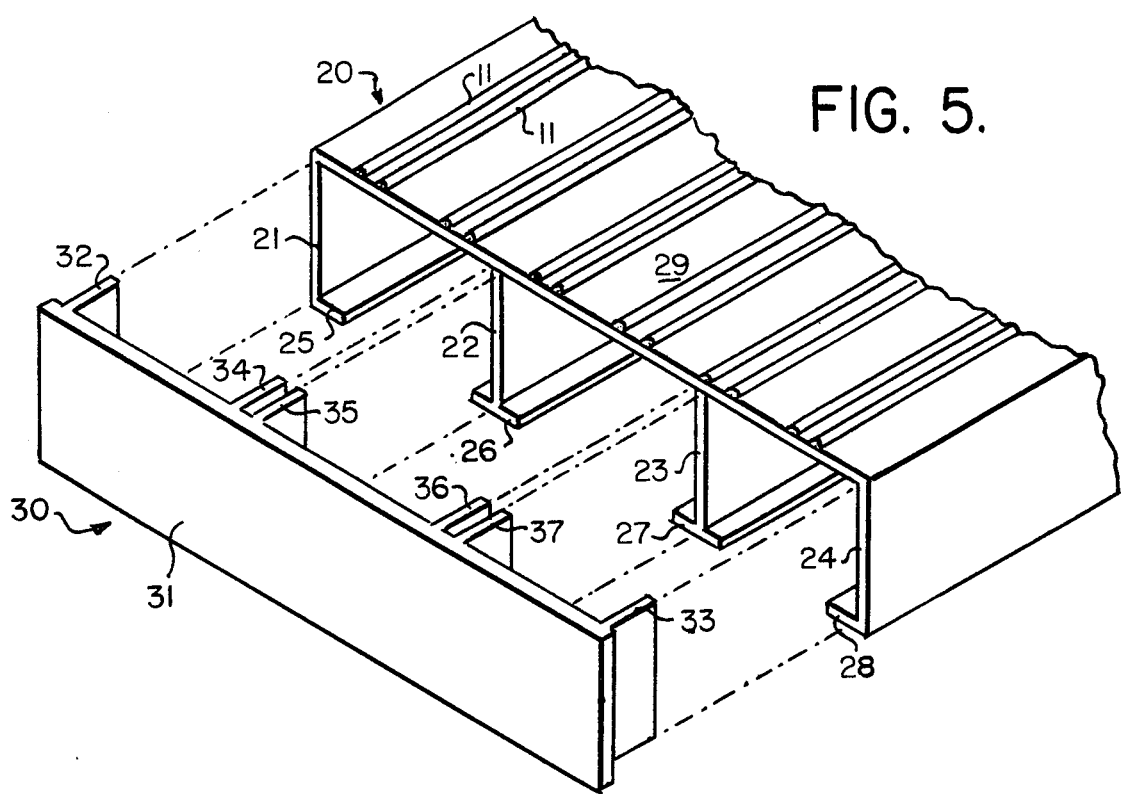
FIG. 5 is an exploaded view of one end of a panel according to the present invention.

Referring now to FIGS. 1-2, the closure 1 according to the present invention is shown mounted in place on a truck T, having a bed B formed by side walls S1 and S2 the real wall C of the cab and the tailgate G. The truck bed B of an open bed truck such as the Chevy Love short body truck is generally rectangular and the closure 1 shown in the unfolded position in FIG. 1 and the fully folded position in FIG. 2, comprises in the embodiment shown, a plurality of elongated panels 2–8, each configured to extend greater than the width of the rectangular opening of the truck bed B to rest on the opposite side walls S1 and S2.

The panels 2–8 are hingedly connected together side-by-side at the longitudinal edges thereof for movement between the unfolded position of FIG. 1 wherein the panels 2–8 lie in a single plane and completely close the opening and a fan-folded position shown in FIG. 2 wherein the panels lie in a single stack superposed on one end panel 8.

The closure 1 is fastened at end panel 8 to the side walls S1 and S2 at the rear cab wall C by a generally L-shaped elongated support 9 which will be described in more detail hereinafter. When the closure is in the unfolded position, locking mean 10 serves to lock panel 2 to the tail-gate G so as to prevent unauthorized opening of the closure.

Since it is desirable to store or load items on the top of the closure when in the unfolded position, panels 2–8 are provided with anti-skid means disposed on the face thereof corresponding to the outside face when in the unfolded position. The anti-skid means, in the embodiment shown, comprises elongated skid ribs 11 at the top surface thereof. These skid ribs, as shown in FIG. 1a, are arcuate in cross section and extend approximately ⅛" in height from the surface of the panes. The ribs prevent the sliding of items on the top of the closure when the closure is wet and also provides a gripping support for an otherwise smooth surface.

Referring now to FIGS. 3 and 4, the means hingedly connecting the panels together comprises living hinges 14 and 15 which extend the entire length of each panel and which are joined to the longitudinal edges of the panels by epoxy layers 16. The hinges 14 and 15 are oppositely directed as shown so as to enable the panels to be folded in the direction shown in the dotted lines of FIG. 4 to achieve the stacking thereof as shown in FIG. 2. It should be noted that in view of the nature of the hinging, one can partially open the closure by the width of anywhere from 1 to 6 panels due to the nature of the fan-folding thereof.

The living hinges 14 and 15 and the fact that they extend along the entire length of each panel and are made of nylon enables the closure, in conjunction with other sealing means to provide a weather-proof and water-proof closure for the truck bed. The sealing means comprises rubber weather stripping disposed between the contact surface of the underside of each panel and the side walls S1 and S2 and the gate G, as will be explained hereinafter. A sealing connection is also provided at support 9 shown in FIG. 4. As shown, panel 8 is bolted at outer side 8a to the vertical flange 91 of support 9 by bolts 95 which have a sealing element 93 therebetween. Horizontal flange 92 of support 9 is bolted to the side walls S1 and S2 by bolts 96. Between the horizontal flange 92 and the side walls and cab wall is provided a sealing strip 94 to further water-proof the closure.

Additionally the connection with bolts 96 can be effected with wing nuts so as to enable the relatively easy removal of the entire closure from the truck. Thus the closure could be used with another truck or it could be replaced if it is in need of repair.

Referring now to FIGS. 5–8, the construction of each panel 2–8 is shown in more detail.

In the preferred embodiment shown in FIGS. 5–8, each panel comprises a channel shaped member 20 having a generally planar top web portion or base 29 with the anti-skid ribs 11 thereon. Depending downwardly from the inner face of the planar portion or base 29 are perpendicular end walls 21 and 24 as well as intermediately disposed perpendicular strengthening ribs 22 and 23. End walls 21 and 24 include inwardly and perpendicularly extending flanges 25 and 28, while strengthening ribs 22 and 23 have perpendicular flanges 26 and 27 disposed thereon. The channel shaped member 20 in a particularly advantageous commercial embodiment is an integral member of extruded aluminum which is advantageously 10" in width and 1¼" in height. The length thereof is of course determined by the width of the truck bed, however as shown in FIG. 8, the member 20 should overhang approximately 1¼" on either side of the side walls S1 and S2. Thus for a 59½" truck width for the Chevy Love short body truck, the members 20 will have an overall length of 62".

On either side of each member 20 is disposed a sealing cap 30 which acts to prevent the entry of water or dirt and thus aids to otherwise weatherproof the closure. The end cap 30 includes a generally planar portion 31 which is configured to completely overlie the cross section of the member 20 and includes engaging members 32 and 33 which are perpendicular to section 30 and which provide a friction type fit on the inner edges of walls 21 and 24. Members 34 and 35 and 36 and 37 define channels for receiving strengthening ribs 22 and 23 in a friction fit and thus further act to maintain the end cap on the member 20. The cap 30 is preferably formed from a rigid plastic or other lightweight material and has a thickness of approximately ⅛" at each planar portion thereof. It should be clear that members 20 and 30 could alternatively be formed from any lightweight material such as aluminum or plastic.

Due to the normal loading on the closure in the lateral direction during use, each of the panels 2–8 includes means 40 which are engageable with the side walls S1 and S2 for preventing lateral movement when in the unfolded position shown in FIG. 1. The means 40 preferably comprises drop pins 44 disposed at either end of the members 20 and means mounting the drop pins for free sliding movement between the retracted position shown in FIG. 7b wherein the pin is inside the member 20 to a projecting position shown in FIG. 7a wherein the pin extends outwardly of the inside face of the member 20 when in the unfolded position.

Each drop pin 44 includes a relatively larger diameter head 45 and is mounted for sliding movement within a cylindrical member 43 which is fixedly mounted between the planar portion 29 of member 20 and a bottom plate 41 which is preferably epoxy sealed to member 20 at flanges 25–28. The bottom plate 41 preferably has an aperture 41a therein which is slightly larger than the diameter of pin 44 and slightly smaller than the diameter of head 45 and thus acts to prevent the inadvertent removal of the pin during use. The bottom plate 41 also includes a strip of weather-proof sealing material 42 thereon at the portion thereof which contacts side walls S1 and S2 of the truck so as to further provide a weather-proof sealing as explained hereinbefore.

During use, when a panel is in the fan-folded position shown in FIG. 2, the pin 44 retracts either by virtue of gravity due to the inverted position of the panel or by virtue of the fact that the panel therebelow pushes the pin upwardly into the cylindrical member 43. In any event, the pins 44 are out of the way when the panels are folded.

However, when the panels are unfolded into the position shown in FIG. 1, pins 44 drop downwardly as shown in FIGS. 7a and 8. The pins are preferably disposed approximately ⅛″ from the inner surface of the side walls S1 and S2. Thus, if there is lateral loading on the panels, pins 44 will engage the inner surface of the side walls S1 and S2 in opposition to these lateral forces. This advantageously prevents the panels from shifting from side to side and from shearing off from either the support 9 or from one another along the hinges 14, 15.

The bottom plates 41 also include apertures 46 disposed at the portion thereof which extend at the over hanging portion of each member 20. These apertures 46 are tied down slots which are configured to receive a cable made of rope or wire so as to enable one to tie down a load on the top of the unfolded closure.

Another feature of the closure according to the present invention is the locking means 50 which enables the closure to be secured during use to prevent unauthorized entry into the storage space. The locking means 50 comprises a locking mechanism enclosed in panel 2 and which cooperates with the tailgate G to releasably connect panel 2 to the tailgate G.

The locking mechanism comprises a key actuated lock 10 which has a shaft 52 connected thereto which is able to be rotated in response to rotation of the key mechanism 10 in response to the insertion and rotation of a proper key therein. Attached to shaft 52 is a latching member 55 which is secured in place between members 53 and 54 which is engageable with a second latch member 57 at a hook portion 56 at the end of the latching member 55. The latch member 57 is connected to the tailgate G and the member 55 along with hook portion 56 is pivotable between a locking and an unlocking position in response to the rotation of shaft 52 by a key in key slot 10.

Figure 6:
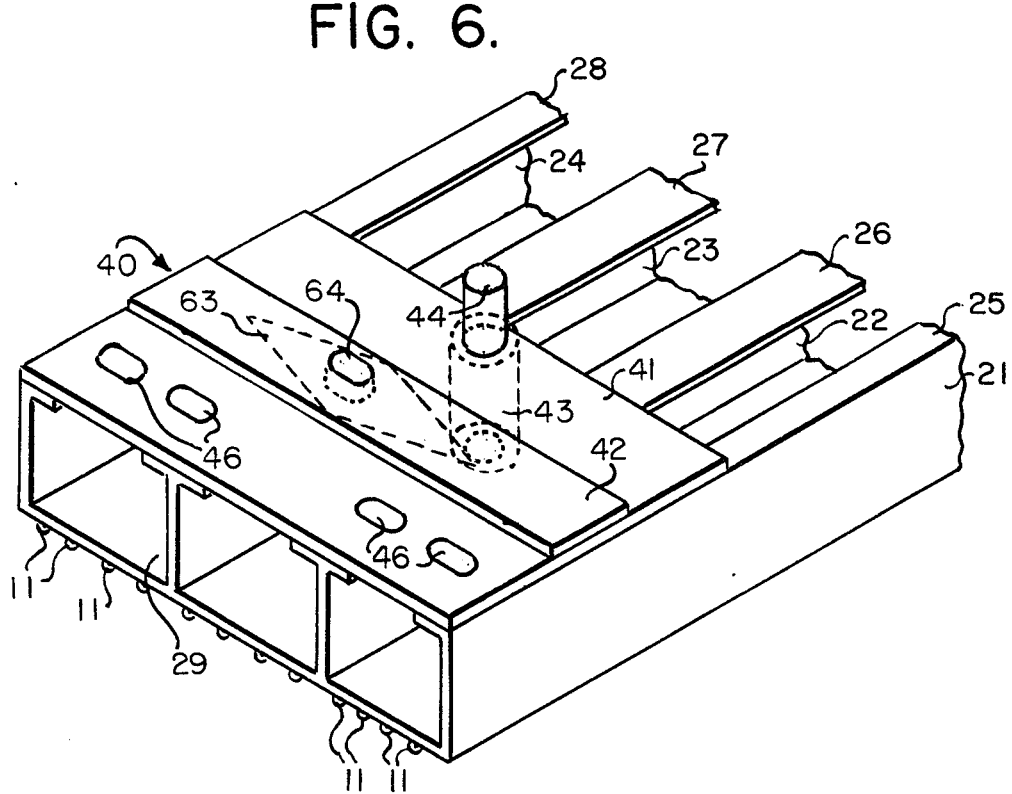
FIG. 6 is a plan view of the bottom of one end of each panel.

Another important feature of the present invention is the provision of a self-contained alarm system 60 associated with the closure and which provides further security in addition to the locking means 50. The alarm system according to the present invention is shown in FIGS. 1, 6 and 10 and comprises a plurality of contact switches 63 mounted below bottom plate 41 and having a movable pushbutton 64 protruding through bottom plate 41 and sealing strip 42 so as to be able to contact the side walls S1 and S2 of the truck. These switches 63 are normally closed and when the panels are placed in the unfolded position shown in FIG. 1, pushbottons 64 are pressed inwardly by the contact with the side walls and switches 63 are all opened. Disposed on the underside of panel 8 is a source 112 and a solid state audible alarm module 62 which is connected together as shown in FIG. 10 with a key switch 12 which is normally open. Key switch 12 and alarm module 62 are connected in series and the series circuit is connected in parallel with all of contact switches 63. Upon the unfolding of the closure into the position shown in FIG. 1 and the locking of lock means 50, if one activates the alarm by closing the key switch 12, the alarm circuit will close if any of contact switches 63 are closed. This would occur by the lifting of either side of any panels 2–8. Thus if one were to either break the lock 50 and begin to lift panel 2 or if one were to try to pry upwardly any of panels 3–7, the result would be to set off the alarm.

It should be clear that while the invention discloses contact switches for each of the panels 2–8, the switches can be placed in only end panel 2 or at one or more of the panels 2–8.

It will be appreciated that the instant specification and claims are set forth by way of illustration and not limitation, and that various modifications and changes may be made without departing from the spirit and scope of the present invention.

What is claimed is:

1. A closure for a load container having a rectangular opening formed by side walls, the closure comprising: a plurality of elongated panels each configured to extend greater than the width of the rectangular opening to rest on two opposite side walls of a load container; means hingedly connecting the panels together side-by-side at longitudinal edges thereof for movement between an unfolded position wherein the panels lie in a single plane and completely close the opening and a fan-folded position wherein the panels lie substantially parallel to each other in a single stack superposed on one end panel; means for fastening said one end panel at a third side wall forming the rectangular opening of the load container; means disposed at the ends of each panel and depending therefrom when the panels are in the unfolded position, said last-named means being spaced just inboard of the associated side wall and engageable with the inner surfaces of the respective two side walls for limiting lateral movement of the panels when in the unfolded position.

2. The closure according to claim 1, further comprising longitudinally extending anti-skid means disposed on one face of each panel corresponding to the outside face thereof when in the unfolded position.

3. The closure according to claim 2, wherein the anti-skid means comprises longitudinal projecting ribs.

4. The closure according to claim 1, wherein the means hingedly connecting the panels comprises a living hinge between each pair of adjoining panels and extending the entire length of each panel and wherein the hinges are alternatively oppositely acting to enable the fan-folding of the panels.

5. The closure according to claim 4, further comprising sealing strips on the face of each panel corresponding to the inside face thereof when in the unfolded position, the strips disposed between the portion of the inside face abutting to side walls of the container, whereby the sealing strips in conjunction with the living hinges provide a weather proof covering for the container.

6. The closure according to claim 1, wherein each panel comprises a channel having a web, and caps closing the end portions of each channel.

7. The closure according to claim 6, wherein each channel includes longitudinal strengthening ribs extending from the web thereof.

8. The closure according to claim 6, wherein the channel and caps comprise at least one of aluminum and plastic.

9. A closure for a load container having a rectangular opening formed by side walls, the closure comprising: a plurality of elongated panels each configured to extend greater than the width of the rectangular opening to rest on two opposite side walls of a load container; means hingedly connecting the panels together side-by-side at the longitudinal edges thereof for movement between an unfolded position wherein the panels lie in a single plane and completely close the opening and a fan-folded position wherein the panels lie in a single stack superposed on one end panel; means for fastening said one end panel at a third side wall forming the rectangular opening of the load container; means disposed at the ends of each panel and engageable with the two side walls for limiting lateral movement of the panels when in the unfolded position, said lateral movement limiting means comprising pins and means mounting each pin in a panel inwardly of the side walls for free sliding movement between a retracted position wherein the pin is inside the panel to a projecting position wherein the pin extends outwardly of the inside face of the panel when the panel is in the unfolded position.

10. The closure according to claim 1, wherein the fastening means comprises an L-shaped elongated member having the outer side of the one end panel fixed to the vertical portion thereof with a sealing strip therebetween and wherein the horizontal portion of the L-shaped member has means for removably fastening same to the container at the third side wall thereof.

11. The closure according to claim 1, further comprising means disposed on the other end panel for releasably locking same onto the fourth side wall when the panels are in the unfolded position.

12. The closure according to claim 11, wherein the locking means comprises a rotatable shaft disposed in the other end panel and a latch member pivotable therewith for movement between a locking and an unlocking position.

13. The closure according to claim 1, further comprising alarm means disposed on the inside face of the one end panel and responsive to the movement of at least one panel from the unfolded position for emitting an audible alarm.

14. A truck comprising: a rectangular open bed container having two side walls, a front wall and a tailgate; and a closure comprising a plurality of elongated panels each configured to extend greater than the width of the rectangular opening to rest on the two side walls, means hingedly connecting the panels together side-by-side at the longitudinal edges thereof for movement between an unfolded position wherein the panels lie in a single plane and completely close the opening and a fan-folded position wherein the panels lie substantially parallel to each other in a single stack superposed on one end panel, means for fastening said one end panel at the front wall, and means disposed at the ends of each panel and depending therefrom when the panels are in the unfolded position, said last-named means being spaced just inboard of the associated side wall and engageable with the two inner surfaces of the respective side walls for limiting lateral movement of the panels when in the unfolded position.

15. The truck according to claim 14, further comprising anti-skid means disposed on one face of each panel corresponding to the outside face thereof when in the unfolded position.

16. The truck according to claim 14, wherein the means hingedly connecting the panels comprises a living hinge between each pair of adjoining panels and extending the entire length of each panel and wherein the hinges are alternatively oppositely acting to enable the fan-folding of the panels.

17. The truck according to claim 16, further comprising sealing strips on the face of each panel corresponding to the inside face thereof when in the unfolded position, the strips disposed between the portion of the inside face abutting to side walls and the tail gate of the truck, whereby the sealing strips in conjunction with the living hinges provide a weather proof covering for the truck bed.

18. A truck comprising: a rectangular open bed load container having two side walls, a front wall and a tailgate; and a closure comprising a plurality of elongated panels each configured to extend greater than the width of the rectangular opening to rest on the two side walls, means hingedly connecting the panels together side-by-side at the longitudinal edges thereof for movement between an unfolded position wherein the panels lie in a single plane and completely close the opening and a fan-folded position wherein the panels lie in a single stack superposed on one end panel, means for fastening said one end panel at the front wall and means disposed at the ends of each panel and engageable with the two side walls for limiting lateral movement of the panels when in the unfolded position, said means for limiting lateral movement comprising pins and means mounting each pin in a panel inwardly of the side walls for free sliding movement between a retracted position wherein the pin is inside the panel and a projecting position wherein the pin extends outwardly of the inside face of the panel when the panel is in the unfolded position.

19. The truck according to claim 14, wherein the fastening means comprises an L-shaped elongated member having the outer side of the one end panel fixed to the vertical portion thereof with a sealing strip therebetween and wherein the horizontal portion of the L-shaped member has means for removably fastening same to the side walls at the front wall of the truck bed.

20. The truck according to claim 14, further comprising means disposed on the other end panel for releasably locking same to the tail gate when the panels are in the unfolded position.

21. The truck according to claim 20, wherein the locking means comprising a second latch member on the tailgate, a rotatable shaft disposed in the other end panel and a first latch member engageable with the second latching member, said first latch member being pivotable with said shaft for movement between an engaged and a disengaged position with respect to the second latching member.

22. The truck according to claim 14, further comprising alarm means disposed on the inside face of the one end panel and responsive to the movement of at least one panel from the unfolded position for emitting an audible alarm.

* * * * *